June 5, 1962

EIICHI HOSOKAWA ET AL 3,037,712

PULVERIZER-SEPARATOR

Filed March 22, 1960

INVENTORS
EIICHI HOSOKAWA
MASUO HOSOKAWA
TAKUZO MATSUYAMA
TOHEI YOKOYAMA

BY

ATTORNEY

June 5, 1962  EIICHI HOSOKAWA ET AL  3,037,712
PULVERIZER-SEPARATOR
Filed March 22, 1960   2 Sheets-Sheet 2
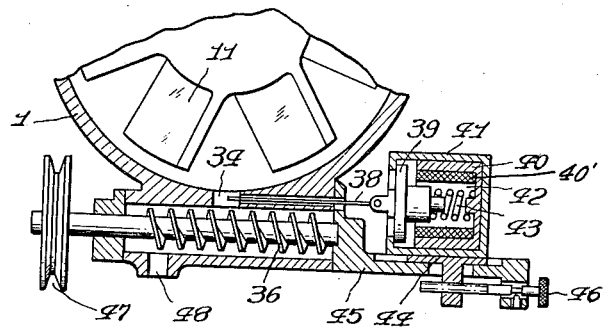
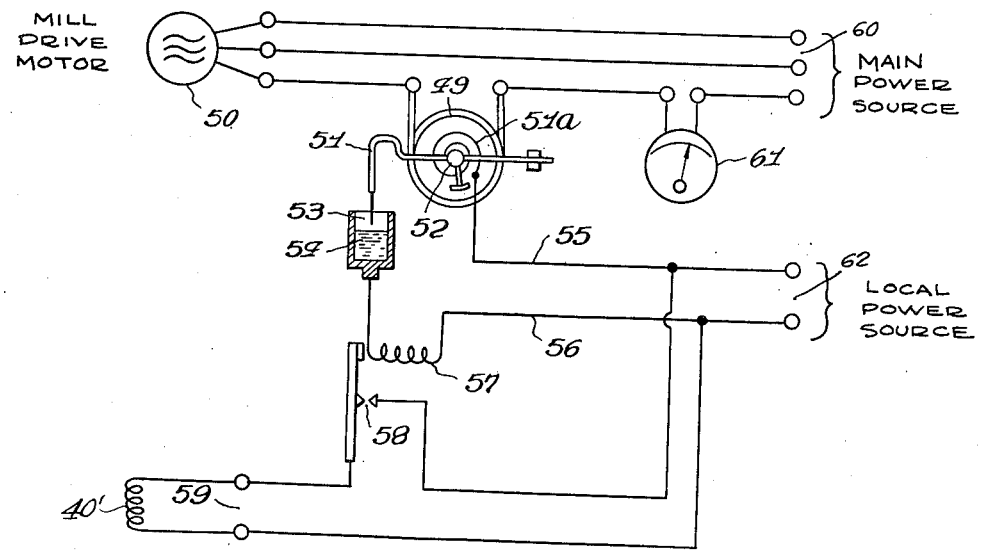
INVENTORS
EIICHI HOSOKAWA
MASUO HOSOKAWA
TAKUZO MATSUYAMA
TOHEI YOKOYAMA
BY
ATTORNEY 3,037,712
Patented June 5, 1962

3,037,712
PULVERIZER-SEPARATOR
Eiichi Hosokawa, 6 2-chome, Toyonakahondori, and Masuo Hosokawa, 160 1-chome, Higashitoyonaka, both of Toyonaka-shi, Japan; Takuzo Matsuyama, 45–2, Aza Minamiyamahata, Takarazuka-shi, Japan; and Tohei Yokoyama, 52 1-chome, Takao-Machi, Osaka-shi, Japan
Filed Mar. 22, 1960, Ser. No. 16,838
Claims priority, application Japan Dec. 30, 1959
7 Claims. (Cl. 241—56)

This invention relates to a pulverizing and separating, or classifying, machine adapted to pulverize mineral ores, plant roots, tree barks, sea shells, various kinds of chemical products and materials, various kinds of food products, and the like; to separate the resulting pulverized products; and to extract said product of only the required grain size.

Among the conventional pulverizer-separators of this type, that wherein crushing blades and crushing-sorting blades, mounted on a horizontal rotary shaft, are installed within a hollow cylindrical casing, or drum, of conical shape having a cross section which decreases toward the outlet, and wherein suction blades are further installed to discharge the pulverized product to the outside is well known in the art, for example, by the specification of Japanese Patent No. 93,098. Also, the use of removable, conical rings having hollow cross sections of conical shape for forming the above mentioned conical constriction and the sorting or classifying, of the grain size of the pulverized product by the use of said conical rings having different inner diameters at the final ends are indicated in the specification of Japanese Patent No. 216,308.

The first object of this invention is to enable continuous regulation of the selected grain size and, at the same time, to improve the efficiency of selective sorting, or classifying, by installing a pulverizing and sorting device of a new type to the above mentioned pulverizer-separator of known type.

The second object of this invention is to provide such a sorting device of a new type as aforesaid, which is of simple construction.

The third object of this invention is to provide a pulverizer-separator wherein the sorted grain size can be varied and adjusted even during operation.

The fourth object of this invention is to provide a pulverizer-separator of the aforesaid type wherein overloading due to such causes as the infiltration of foreign substances into the substance being pulverized or any sudden increase in the feed rate is effectively prevented.

The manner in which the foregoing as well as other objects and advantages may best be achieved will be understood more fully from a consideration of the following detailed description, taken in conjunction with one example illustrated in the accompanying drawings, in which the same members are indicated by the same numerals and in which:

FIG. 5 is an elevational view, partly in section and with parts cut away, of one portion of the section taken along line V—V in FIG. 1, showing the principal construction of the automatic, overload-preventing device which constitutes a further principal part of the embodiment of FIGS. 1 and 2;

FIG. 6 is an electric circuit diagram of the electrical control circuit for the device of FIGS. 1–5.

Figure 1:
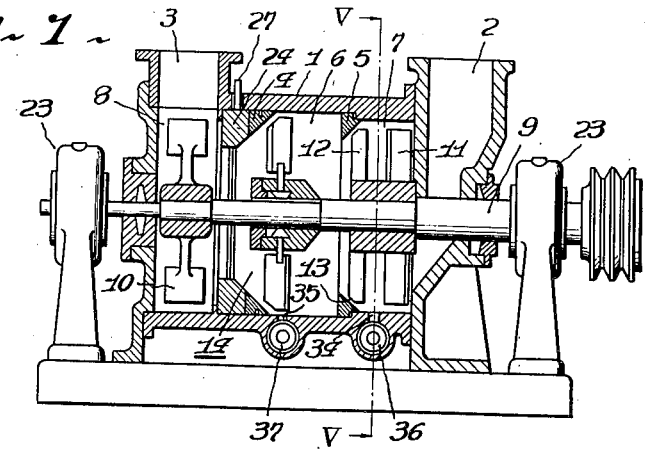
FIG. 1 is a simplified, side elevational view, partly in longitudinal section, showing the construction of one example of a puverizer-separator embodying the present invention.

Referring to FIG. 1, reference numeral 1 designates a split type cylindrical casing having a raw material feed inlet 2 at one end and a discharge outlet 3 at the other end thereof. Split conical rings 4 and 5 are fitted into the interior of the casing 1, on the side near the outlet 3 and in the central portion, respectively. For each type of said conical ring, a plurality of sets of rings of different, minimum inner diameter are prepared so that it is possible to use rings of suitable inner diameter in accordance with the requirements. The casing interior between the conical rings 4 and 5 forms the pulverizing-sorting chamber 6, and the section between the conical ring 5 and the part connected to the raw material feed inlet forms the crushing chamber 7. The inner diameter of the pulverizing-sorting chamber 6 is greater than the inner diameter of the crushing chamber 7. A suction chamber 8 is formed below the discharge outlet 3.

A shaft 9, which is supported at both ends by bearings 23 is installed so as to pass through the center of the casing 1. This shaft supports a suction impeller 10 in the suction chamber 8, a crushing impeller 11 and a crushing-sorting impeller 12 in the crushing chamber 7, and a pulverizing-sorting device 14 in the pulverizing-sorting chamber 6. The outer diameter of the pulverizing-sorting device 14 is greater than the outer diameter of the crushing impeller 11 and that of the crushing-sorting impeller 12; consequently, with the same angular velocity of the common shaft 9, the said device 14 has a greater peripheral velocity than those of the said impellers 11 and 12.

The aforesaid crushing impeller 11, which comprises a plurality of blades, which have some twist, imparts impact force on the raw material and crushes it. At the same time, said impeller imparts, to the crushed raw material, rotation and motion of transfer toward the pulverizing-sorting chamber 6. The crushing-sorting impeller 12 comprises a plurality of plates without twist or pitch attached in radial formation to the shaft 9, the tips of said plates which are facing the conical ring 5 being beveled parallel to the conical surface of said ring with a clearance 13 therebetween.

Figure 2:
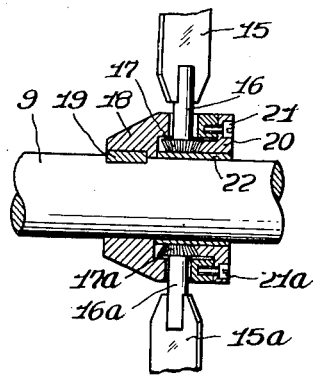
FIG. 2 is an elevational view, partly in section and with parts cut away, showing the principal construction of the grain-size sorting and pulverizing device constituting a principal part of the embodiment.

The pulverizing-sorting device 14, which is housed within the pulverizing-sorting chamber 6, and which is capable of pulverizing in addition to sorting by grain size, comprises a plurality of blades attached in radial formation to the shaft 9 and a mechanism which enables adjustment and setting of the angle of twist or pitch of the said blades. This construction is shown in detail in FIG. 2, referring to which, a plurality of blade root holes are provided radially in the hub 18 which is fixed to the shaft 9. In said holes are fitted blade root shafts 16, 16a . . . of a plurality of blades 15, 15a . . . . Bevel gears 17, 17a . . . are fixed, respectively, to the inner ends of said shafts 16, 16a . . . within the hub 18. A pitch-adjusting ring 20 for adjusting the pitch or twist of the said blades is fitted, rotatably with respect to the shaft 9 for adjustment, in the hub 18 and has a bevel gear portion which meshes with the aforesaid bevel gears 17, 17a . . . . This pitch-adjusting ring 20 is fixed in its adjusted setting with respect to the hub 18 by screws 21, 21a, . . . . The shaft 9 is provided with a bushing 22 and a key 19 which locks this pulverizing-sorting device to the shaft 9. For adjustment by means of this device, screws 21, 21a, are loosened, and the adjusting ring 20 is rotated, whereupon all of the bevel gears 17, 17a, . . . meshed with the bevel gears of the ring 20 rotate through the same angle. In this manner the blades 15, 15a, . . . can be rotated to the desired pitch angle and their angle setting can then be fixed by tightening the screws 21, 21a, . . . .

Figure 3:
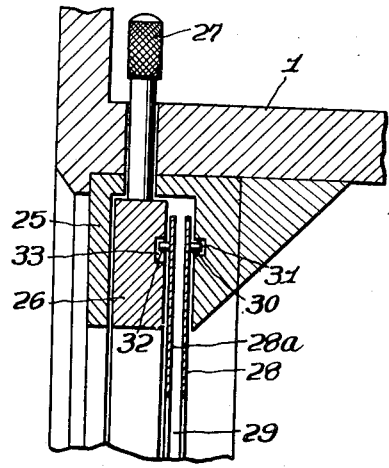
FIG. 3 is an elevational view, partly in section and with parts cut away, showing the construction of the device for adjusting the grain size, constituting another principal part of the embodiment of FIGS. 1 and 2.

In addition, a device 24 for adjusting the sorted grain size is installed within the casing 1 between the suction chamber 8 and the conical ring 4. Said device 24 has a construction which is similar to the iris diaphragm of a photographic camera. The details thereof are clearly shown in FIGS. 3 and 4, in which said device is shown to comprise: a fixed ring body 25 of circular form; a movable ring 26 disposed coaxially with said ring 25; a lever 27 for rotating said movable ring 26 in sliding rotation from outside of the casing; and contractile, iris diaphragm plates 28, 28a, . . . which, as a set of several plates, form the aperture 29. Several of the contractile plates 28, 28a, . . . encompass the central aperture 29 in equi-spaced distribution, the shape of the said aperture 29 approaching a true circle as the number of said plates is increased.

Figure 4:
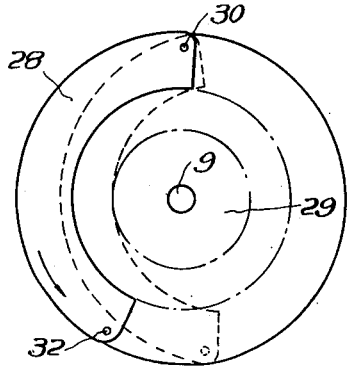
FIG. 4 is an explanatory diagram illustrating one example of movement of the device of FIG. 3.

Since a graphical, simultaneous description of all of the aforesaid contractile plates would only lead to confusion, the movement of only one plate 28 has been indicated in FIG. 4, in which the representative contractile plate 28 has, at both of its ends, pins 30 and 32 protruding in opposite directions. The pin 30 on one side fits into a hole 31 made in the fixed ring 25, and the pin 32 on the opposite side fits into a hole 33 made in the movable ring 26. With this construction, if the lever 27 is now moved to rotate the movable ring 26, one end, that is, the end having the pin 30 being pivotally fixed, the other end having the pin 32 will move in the arrow direction. In this manner, all of the contractile plates move simultaneously toward the center of the device. As the result, the aperture 29 formed in the center becomes smaller. If the lever 27 is moved in the opposite direction, the contractile plates will move outwardly, and the aperture 29 will become larger. Thus, by manipulating the said lever 27 from the outside, it is possible to adjust at will and easily the size of the aperture 29 at the center of the device.

As shown in FIG. 1, through-holes 34 and 35 are provided at the bottoms of the previously mentioned crushing chamber 7 and pulverizing-sorting chamber 6, respectively, in the vicinity of the ends of their respective conical rings, said through-holes communicating, respectively, with screw conveyors 36 and 37 installed therebelow. Said screw conveyors 36 and 37 discharge, out of the machine, excessive raw material which has not been crushed or pulverized to the predetermined grain size and foreign substances of high hardness value or substances of high specific gravity, and an automatic, overload-preventing device, which operates interrelatedly with said discharge device, is installed together therewith. The details of these parts will be more clearly apparent by reference to the following description of an example illustrated in FIGS. 5 and 6.

Referring to FIG. 5, numerals 34 and 36 again designate the aforementioned through-hole and screw conveyor, respectively. The size or degree of opening of the through-hole 34 is regulated by a gate plate 38, which can be controlled steplessly from outside of the casing by means of an electromagnetic or solenoid device comprising: an electromagnet 40 including coil 40'; a movable iron core 39 which is connected to the said gate plate 38 and is actuated by the said electromagnet 40; a spring 42 which pushes the iron core 39 to the left as viewed in FIG. 5 (in the direction in which gate plate 38 closes) to form a gap 43 when electric current is not flowing through the electromagnet; an outer housing 41 enclosing the electromagnet 40; and a slidable carriage 44, which is fixed rigidly to and adjustably shifts the entire electromagnetic device, and which is mounted slidably on a slide base 45. By rotating an adjusting screw 46, said slidable carriage, hence the entire electromagnetic device, can be made to slide as desired to the left or right to vary the position of the gate plate 38, which is integrally connected to the electromagnetic device, thereby to adjust the initial setting for the degree of opening of the through-hole 34.

The aforesaid screw conveyor is driven by means (not shown) through a pulley 47 and discharges the material being conveyed through a discharge port 48.

In exactly the same manner as described above, a gate plate and its control device can be used also for controlling the degree of opening of the through-hole 35 of the pulverizing-sorting chamber 6.

Referring now to FIG. 6, reference numeral 49 designates a detecting switch of the moving-iron type, wherein a contact arm 51 rocks, in response to the magnitude of the electric current passing through a drive motor 50 which drives the pulverizer, about a pivot 52 as the center of rotation and switches the local circuit off or on. When the said current is within a predetermined range, the contact arm 51 is maintained in either the horizontal position or an attitude in which the left hand side (as viewed in FIG. 6) is high, and the local circuit is in the switched-off or open condition. However, if the predetermined current is exceeded, the contact 53 on the left end of the contact arm 51 contacts the mercury contact 54 to close the local circuit (55, 56), thereby causing current to flow through a relay coil 57 and thus energizing said coil 57. The value of the said predetermined current can be set at will be adjusting the vertical position of the mercury container or by adjusting the spring 51a which balances the contact arm 51. Numeral 58 designates a relay contact which is closed in accordance with the energization of the relay coil 57 to operate an electromagnet 40 (FIG. 5) which is connected to terminals 59. Numerals 60 designates the electric power source terminals; 61 designates an ammeter; and 62 designates the terminals for the power source for the local circuit (55, 56) and the circuit for energizing the aforesaid electromagnet 40.

The operation of the pulverizer-separator of this invention, one example construction of which has been described above, and the functioning of the various parts will be understood more fully by reference to the following description.

First, electric power is supplied to the drive motor 50 to drive the shaft 9, and the raw material to be pulverized is fed through the raw material feed inlet 2. The said raw material will then be sent into the crushing chamber 7, where it is crushed by impact by the crushing impeller 11 rotating at high speed and, simultaneously receiving a force tending to move it to the left (as viewed in FIG. 1), it reaches the crushing-sorting impeller 12. Here, the said raw material is subjected to centrifugal force due to the rotation of the crushing-sorting impeller 12, and while it is being crushed as it is subjected to forces tending to force it through the clearance 13 between the said impeller 12 and the conical ring 5, the raw material which has been reduced in size to a certain degree is automatically sent to the pulverizing-sorting chamber 6. The grain size of this material sent to the pulverizing-sorting chamber 6 is determined by the minimum inner diameter of the conical ring 5. That is, only the raw material particles which have been crushed into such fine grain sizes that the centrifugal force acting thereon is below a certain magnitude is able to pass the conical ring 5; and the larger particles of the raw material, being subjected to centrifugal force by the crushing-sorting impeller 12 and, as they roll, continue rotation at the outer periphery of the crushing-sorting impeller 12 and between the individual blades thereof, colliding against said blades, and circulate along the conical surface. Then, only the particles of the raw material which have been reduced in size by the above crushing action to the degree that the centrifugal force imparted thereon becomes less than the aforesaid certain magnitude cease circulating and move to the pulverizing-sorting chamber 6. On the other hand, coarse particles which have remained for a long time in the crushing chamber 7 and continued the above-described rotational motions finally fall into the through-hole 34 and are discharged out of the machine by the screw conveyor 36. Furthermore, among the particles of foreign materials which have become mixed with the raw material, those which are not easily crushed, have high hardnesses, and/or have high specific gravities also undergo the above-described, complex motion of rotation and circulation then eventually fall into the through-hole 34 to be separated out and removed as a natural result.

The fine particles of the raw material which have been sorted to a certain degree in the crushing chamber 7 in the above manner, then sent into the pulverizing-sorting chamber 6, are here subjected to fine pulverization and precise separation and sorting, which are accomplished in the following manner. On each of the raw material particles, which are being drawn by the suction chamber 8, a centrifugal force which is in proportion to the mass of said each particle is imparted by the rotation of the pulverizing-sorting device 14 in a direction which is perpendicular to the horizontal direction of the force due to the suction impeller 10. If the said centrifugal force on a particle is less than the suction force exerted thereon, said particle will be drawn into the suction chamber and delivered as a product out of the discharge outlet 3. On the other hand, however, if a particle is relatively large, and its centrifugal force overcomes its suction force, said particles will be whirled out of the region of the suction force and, influenced by the rotation of the pulverizing-sorting device 14, will repeat circulatory motion along the interior peripheral wall of the pulverizing-sorting chamber 6 as it rotates around the individual blades of the pulverizing-sorting device 14. During this process, the said particle is subjected to powerful impacts by the blades of the pulverizing-sorting device 14, which has a larger diameter, therefore, a higher peripheral velocity, than the crushing-sorting impeller 12. Furthermore, said particle is made to collide at high speed against also the interior wall of the said pulverizing-sorting chamber and to collide and rub against other like particles. By the repetition of the above actions, said particle is subjected to ultra-pulverization, whereby said particle is reduced to a grain size which is finer than obtained in the preceding chamber, and after said grain size reaches a certain magnitude, said particle is sent to the suction chamber 8.

Any coarse particles which have been subjected to a repeated circulation for a long time within the pulverizing-sorting chamber 6 and any other particles, which are not easily pulverized, are hard, or have high specific gravities, of foreign substances mixed in among said coarse particles, are all discharged out of the machine through the through-hole 35 by the screw conveyor 37. Thus separation and sorting are effected in a natural manner.

Or course, similarly as in the case of the conical ring 5, by adjusting the magnitude of the clearance between the inner surface of the conical ring 4 and the blade tips of the pulverizing-sorting device 14, the pulverizing effectiveness can be regulated. Furthermore, in the machine of this invention, the magnitudes of the centrifugal force and the horizontal suction force can be maintained suitably by adjusting, at will, the angle of twist, or pitch, of the blades 15, 15a . . . of the pulverizing-sorting device 14, thereby varying the sorted grain size as desired.

In other words, at the same time that it acts as an air fan, or propeller, the sorting device 14 effects also the work of imparting centrifugal force in the radial direction to the powdered particles; and, since by the adjustment of the angle of twist, or pitch, of the aforesaid blades, the direction of propelled air can be varied over a wide range, the sorted grain size can be controlled precisely over a wide range by suitably varying the ratio between the horizontal force and radial force acting on the said powdered particles.

The powdered particles drawn in the above-described manner toward the suction chamber 8 next reach the position of the device 14 for adjusting the sorted grain size and must pass through the aperture 29 of said device. As described heretofore, each of the particles which have passed through the sorting device 14 is acted upon by a centrifugal force according to its mass. Particles which have a low mass (consequently a small particle diameter) and acted upon by a low centrifugal force have a small radii of motion, or trajectory, that is, the said particles are situated in the vicinity of the center. On the other hand, coarse particles with large masses are distributed at relatively greater distances from the center. Therefore, it is possible to selectively sort the grain size, as desired, according to the size of the aperture 29 of the device for adjusting sorted grain size and to send the particles thus sorted into the suction chamber 8. Moreover, this adjustment of the sorted grain size can be accomplished steplessly, at will, by manipulating the lever 27 and controlling the contractile plates 28, 28a, . . . .

The fine particles obtained by subjecting them, in the above-described manner, to three stages of pulverizing, separating, and sorting, are delivered as the pulverized product out of the discharge outlet 3.

In the event of overloading of the machine due to such causes as accidental infiltration of hard foreign substances into the raw material to be pulverized, or a sudden increase in the feed rate of the raw material through the feed inlet 2, the load current of the drive motor 50 increases; the detecting switch 49 of FIG. 6 functions automatically to close the contacts 53 and 54, which then pass electric current through the relay coil 57; and the contact 58 closes to energize the electromagnet 40 shown in FIG. 5. As a result, the iron core 39 is pulled to the right as viewed in FIG. 5), moving the gate plate 38 also to the right. Then, since the through-hole 34 is opened widely, the excess raw material is quickly discharged out of the machine by the screw conveyor 36. Then, when the quantity of raw material in the crushing chamber 7 is returned, in this manner, to the normal, or rated, value, the load current of the drive motor decreases; the contact arm 51 of the detecting switch 49 returns to its original, horizontal position; the contacts 53 and 54 are opened; the energizing current to the electromagnet 40 is cut off; the iron core 39 is returned again to the left by the force of the spring 42; the through-hole 34 is accordingly closed suitably by the gate plate 38; and the machine is returned to its normal operational condition. In other words, since, even if sudden overloading occurs, this is compensated for promptly and automatically, such occurrences as deviations in the sorting precision due to a drop in the rotational speed of the drive motor or breakdowns and seizures are prevented. Therefore, constant vigilance is unnecessary, and unattended, automatically-controlled operation is possible.

Since it is obvious that many changes and modifications can be made in the above-described details without departing from the nature and spirit of the invention, it is to be understood that the invention is not to be limited to the details described herein except as set forth in the appended claims.

What we claim:

1. A pulverizer-separator for pulverizing and separating material comprising an elongated, hollow cylindrical casing having an inlet and an outlet, a material crushing impeller rotatably mounted within said casing adjoining said inlet, said crushing impeller having a plurality of blades with at least a portion of each blade being inclined relative to an intersecting axial plane to impart an axially directed force to said material being crushed to urge it in a direction away from said inlet, a sorting impeller rotatably mounted in adjoining relationship to said crushing impeller, said sorting impeller having a plurality of blades, with each blade being parallel to said axial plane, a first conical ring carried by said casing and in spaced relationship to the outlet side of said sorting propeller blade tips, a pulverizing-sorting impeller rotatably mounted within said casing between said sorting impeller and said outlet, said pulverizing and sorting impeller having impeller blades with at least a portion of each blade surface defining a plane angularly disposed relative to said axial plane, a second conical ring carried by said casing and disposed adjoining the pulverizing-sorting impeller blade tips and between the last said impeller and said outlet, and means for rotating the several impellers.

2. A pulverizer separator according to claim 1 wherein the diameter of said casing part surrounding said crushing and sorting impellers is smaller in diameter than the casing part surrounding the pulverizing-sorting impeller.

3. A pulverizer-separator according to claim 1, wherein the rotational outer diameter of said pulverizing-sorting impeller is made larger than the rotational outer diameter of said crushing impeller.

4. A pulverizer-separator according to claim 1, wherein the blade pitch angle of said pulverizing-sorting impeller is adjustable.

5. A pulverizer-separator according to claim 1, including an adjustable aperture disposed between the pulverizing-sorting impeller and said outlet.

6. A pulverizer-separator according to claim 1, wherein said impellers are driven by at least one electric motor, said casing includes apertures extending through the wall thereof with one aperture adjoining said crushing and sorting impellers and another aperture disposed on the inlet side of said pulverizing-sorting impeller for discharging excessive contents, at least one of said apertures being provided with a gate plate including means automatically controlling the position of said gate plate relative to its associated aperture in response to variations in the electric load current of said electric motor for driving the said pulverizer-separator, whereby an increase in current will cause the gate to open said aperture.

7. A pulverizer-separator according to claim 1, wherein said casing includes apertures extending through the wall thereof with one aperture adjoining said crushing and sorting impellers and another aperture disposed on the inlet side of said pulverizing-sorting impeller for discharging unnecessary contents produced during crushing operation.

References Cited in the file of this patent

UNITED STATES PATENTS

| | | |
|---|---|---|
| 448,844 | Burnham et al. | Mar. 24, 1891 |
| 539,507 | Elliott | May 21, 1895 |
| 561,744 | Witmer | June 9, 1896 |
| 795,133 | Johnson | July 18, 1905 |
| 1,621,571 | Witz | Mar. 22, 1927 |
| 1,742,434 | Costello | Jan. 7, 1930 |
| 2,699,898 | Rogers | Jan. 18, 1955 |

FOREIGN PATENTS

| | | |
|---|---|---|
| 311,110 | Germany | Nov. 15, 1920 |